US008428246B2

(12) United States Patent
Venugopal et al.

(10) Patent No.: US 8,428,246 B2
(45) Date of Patent: Apr. 23, 2013

(54) UNIFIED CUSTOMER SERVICE INTERACTIONS

(75) Inventors: Kannan Venugopal, Tamil Nadu (IN);
Prateek Mehrotra, Uttar Pradesh (IN);
Vishal Bhasin, Haryana (IN); Sumit K Mukherjee, Tamil Nadu (IN);
Ashokkumar Kannan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 12/778,696

(22) Filed: May 12, 2010

(65) Prior Publication Data
US 2011/0280391 A1 Nov. 17, 2011

(51) Int. Cl.
*H04M 3/00* (2006.01)
(52) U.S. Cl.
USPC .................................. 379/266.1; 379/266.01
(58) Field of Classification Search .. 379/266.01–266.1, 379/265.01–265.14
See application file for complete search history.

(56) References Cited

U.S. PATENT DOCUMENTS

| 5,724,419 A * | 3/1998 | Harbuziuk et al. ....... 379/266.04 |
| 6,363,145 B1 * | 3/2002 | Shaffer et al. ............ 379/265.02 |
| 6,421,427 B1 * | 7/2002 | Hill et al. .................... 379/88.14 |
| 6,563,788 B1 * | 5/2003 | Torba et al. ..................... 370/229 |
| 6,724,887 B1 * | 4/2004 | Eilbacher et al. ........ 379/265.03 |
| 2006/0256956 A1 * | 11/2006 | Lee et al. ................. 379/266.01 |
| 2008/0021762 A1 * | 1/2008 | Coon et al. ...................... 705/10 |
| 2008/0080483 A1 * | 4/2008 | Calahan et al. ............... 370/352 |
| 2008/0152122 A1 * | 6/2008 | Idan et al. ................ 379/265.07 |
| 2009/0110157 A1 * | 4/2009 | Erb ................................. 379/85 |

* cited by examiner

*Primary Examiner* — William Deane, Jr.

(57) ABSTRACT

A server device configured to receive first-information associated with a call that was received by a first server device; receive second-information associated with the call, where the second-information is associated with processing of the call by the first server device and at least one second server device; generate a unified record associated with the call, where the unified record includes at least some of the first-information and at least some of the second-information; determine, based on the unified record, that a condition exists with respect to the call; and send an instruction to perform a customer operation with respect to the call when the condition is determined to exist, where the customer operation includes increasing a priority for handling of the call by a customer service agent.

21 Claims, 7 Drawing Sheets

| 605 | 610 | 615 | 620 | 702 | 704 | 706 | 708 | 710 | 712 |
|---|---|---|---|---|---|---|---|---|---|
| CALL IDENTIFIER | MDN/LDN | RECEIVING CLIENT | TIME RECEIVED | CURRENT DESTINATION CLIENT | CURRENT TRANSFER NUMBER | CURRENT HANDLING TIME | TOTAL TRANSFERS | TOTAL TIME IN QUEUE | TIME TERMINATED |
| C1 | 890-321-4567 | VOICE PORTAL 220-1 | T001 | CALL CENTER SERVER 230-1 | 901-432-5678 | T2 | 01 | 0 | - |

| 605 | 610 | 615 | 620 | 702 | 704 | 706 | 708 | 710 | 712 |
|---|---|---|---|---|---|---|---|---|---|
| CALL IDENTIFIER | MDN/LDN | RECEIVING CLIENT | TIME RECEIVED | CURRENT DESTINATION CLIENT | CURRENT TRANSFER NUMBER | CURRENT HANDLING TIME | TOTAL TRANSFERS | TOTAL TIME IN QUEUE | TIME TERMINATED |
| C1 | 890-321-4567 | VOICE PORTAL 220-1 | T001 | CALL CENTER SERVER 230-K | 109-876-2345 | T12 | 03 | HH:MM:SS | T13 |

UNIFIED CUSTOMER SERVICE INTERACTIONS

BACKGROUND

Today's user devices are capable of performing an ever-increasing variety of functions and tasks that continue to improve the user's experience. User devices can run a variety of applications, can connect to a variety of wired and wireless networks, and can handle an array of data and communications, such as text, voice, video, etc. As functionality and performance improve, so too does the complexity associated with using the user device or making use of the array of applications stored on the user device. As a result, users may seek help by contacting a customer service agent associated with the user device. Unfortunately, users may be misdirected to the wrong customer service agent, may be transferred to multiple customer service agents, and/or may expend large amounts of time on hold waiting for, or interacting with, the customer service agent before receiving the desired assistance.

BRIEF DESCRIPTION OF THE DRAWINGS

FIG. 7A is a diagram of an exemplary unified customer service interaction record capable of being used within the network of FIG. 2; and FIG. 7B is a diagram of another exemplary unified customer service interaction record capable of being used within the network of FIG. 2.

DETAILED DESCRIPTION OF PREFERRED EMBODIMENTS

Figure 1:
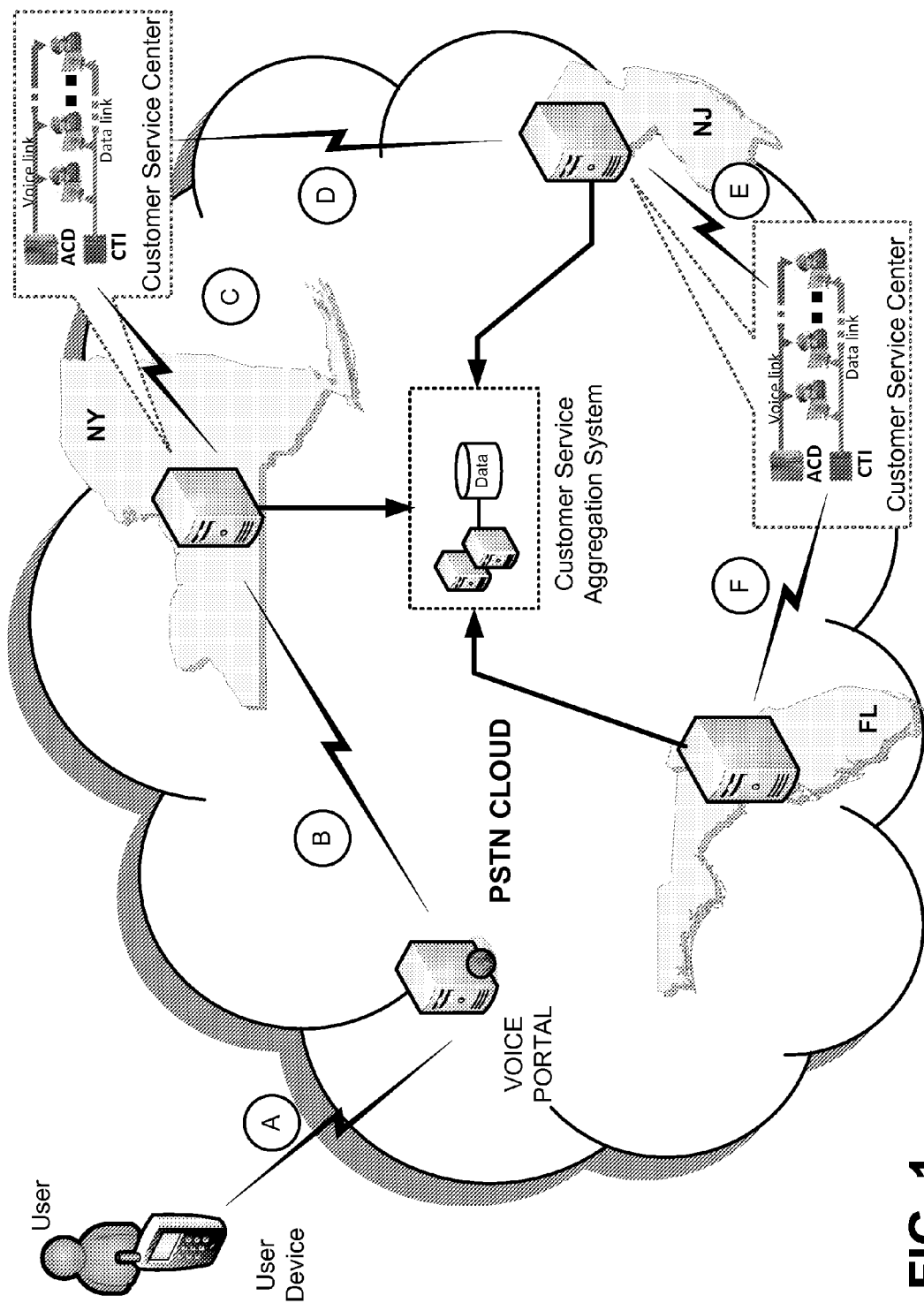
FIG. 1 is a diagram that illustrates an overview of a unified customer service interactions implementation described herein.

The following detailed description refers to the accompanying drawings. The same reference numbers in different drawings may identify the same or similar elements. Also, the following detailed description does not limit the invention.

An implementation described herein may include systems and/or methods that provide for unified customer service interactions using a technique that can monitor customer service interactions (hereinafter referred to as "interactions") between a user device and a network device associated with unified customer service operations, can detect a customer service condition (hereinafter referred to as a "condition") based on the interactions, and can perform operations to address the condition on a real time basis and/or to reduce the frequency of recurrence of the condition. A condition, as used herein, may be triggered when the user device calls a customer service center and is misdirected to the wrong customer service center, is transferred to other customer service centers in which the quantity of transfers exceeds a particular transfer threshold, and/or the call is handled for a period of time that exceeds a particular time threshold.

As described herein, a registration operation may be performed. For example, a registration operation may be performed in which a network topology is generated that enables interactions between the user device and customer service centers and/or other network devices to be monitored and/or stored in a customer service interaction record (hereinafter referred to as an "interaction record").

As further described herein, a customer service operation may be performed. For example, a user of a user device may desire customer service assistance and may place a call to a voice portal server. The user device may interact with the voice portal server and/or may be transferred to customer service centers during which sequence information, associated with the interactions and/or transfers may be monitored and/or stored in an interaction record. A condition associated with the sequence information may be detected (e.g., when a misdirected transfer is detected, when the number of transfers exceeds a particular threshold, and/or when the time, associated with the sequence, exceeds a particular time threshold). When the condition is detected, a customer service operation may be performed. The customer service operation may include generating a unified customer service interaction record (hereinafter referred to as a "unified interaction record") associated with a call, expediting call handling, transferring the call (e.g., including the unified interaction record) to a particular call center that handles conditions, etc.

As yet further described herein, a process improvement operation may be performed. For example, a process improvement operation may be performed in which sequence information (e.g., interaction record and/or unified interaction record) is sent to a process improvement team when a call is concluded (e.g., when the call is terminated). The process improvement operation may use the sequence information to improve the future user experience by reducing the occurrence of misdirected calls, reducing the quantity of transferred calls, and/or by reducing times associated with handling calls.

FIG. 1 is a diagram that illustrates an overview of a unified customer service interactions implementation described herein. As illustrated in FIG. 1, a user device may communicate with customer service network devices associated with a network (e.g., shown as PSTN cloud). The network, as shown in FIG. 1, may include a set of network devices, associated with customer service, and interconnected via the PSTN cloud, such as a voice portal server; a customer service center located, for example, in New York (e.g., CSC-NY); a customer service center locate, for example, in New Jersey (CSC-NJ); a billing center located, for example, in Florida (BC-FL); and/or a customer service aggregation system.

Assume that a user, of the user device, desires to communicate with a customer service agent, associated with the user device, about a billing question. For example, the user may place a call, using the user device, to the voice portal server and the user device may interact with the voice portal server (e.g., shown by indication A). In this example, the voice portal server may be an interactive voice response unit (IVRU) and may instruct the user to listen to a voice menu of items and to select the menu item (e.g., by speaking into the user device) that, in the opinion of the user, most closely addresses the user's billing question. The voice portal server may receive the selection spoken by the user and, using speech recognition techniques, may determine that the user desires assistance regarding a billing question. The voice portal server may transfer the call to CSC-NY (e.g., shown by indication B) based on the selection. CSC-NY may receive the call and may place the call in a queue (e.g., by placing the user device on hold and/or by instructing the user to listen to a menu of items, to make a selection from the menu, and/or to wait for a customer service agent) before a customer service agent, associated with CSC-NY, answers the call. The customer service agent may answer the call and may interact with the user of the user device (e.g., shown by indication C). The customer service agent may transfer the call to CSC-NJ based on the interaction with the user, CSC-NJ may receive the call, and may place the call in a queue (e.g., shown as indication D). The customer service agent, associated with CSC-NJ, may answer the call and may interact with the user of the user device (e.g., shown as indication E). The customer service agent, associated with CSC-NJ, may transfer the call to BC-FL based on the interaction with the user. A billing agent, associated with BC-FL may answer the call and may answer the billing question received from the user.

The customer service aggregation system may generate, receive, and/or store sequence information. For example, the customer service aggregation system (hereinafter referred to as "aggregation system") may be connected to the devices associated with the customer service network and may monitor the call and/or transferred calls (e.g., shown by indications A through F). In this example, the aggregation system may receive sequence information associated with a number of calls being handled by the customer service network (e.g., including the call described above) and may store the sequence information in an interaction record for each call. More particularly, the aggregation system may obtain sequence information associated with the call received from the user device (e.g., a call identifier (C1)), a particular time the call was received, information associated with the receiving device (e.g., voice portal server identifier), a particular time at which the call was transferred to another network device, etc. Additionally, or alternatively, the aggregation system may record information associated with each transfer of C1, such as a call center identifier (e.g., CSC-NY) to which the call was transferred, customer service agent identifier, the number used to transfer C1 to the customer service center (e.g., 201-999-999), the amount of time that the call was in the queue, etc. The sequence information associated with each call on the network may be stored in an interaction record.

A condition may be detected based on a unified interaction record. For example, the aggregation system may generate a unified interaction record by consolidating the sequence information, associated with the call, into a unified interaction record. In one example, the aggregation system may use the information, read from the unified interaction record, to determine that a condition exists when the time associated with the call and/or the time associated with call handling by a particular network device (e.g., CSC-NY)) exceeds a particular time threshold. In another example, the aggregation system may determine that a condition exists when the quantity of transfers exceeds a particular transfer threshold. In yet another example, the aggregation system may determine that a condition exists when a misdirected transfer is detected (e.g., when the user selected a billing menu item when interacting with the voice portal system and was transferred to CSC-NY instead of BC-FL).

The aggregation system may perform a customer service operation when a condition is detected. For example, the aggregation system may detect the presence of a condition and may direct the call to a customer service agent to remedy the condition. In another example, the aggregation system may place the call at (or near) the front of the queue to reduce or eliminate the waiting time associated with the time that the call is in the queue before a customer service agent answers. In yet another example, the aggregation system may transfer the call to a particular customer service center that is specifically equipped (e.g., with customer service agents specially trained, with specialized tools, etc.) to handle calls with which a condition is associated.

A process improvement operation may be performed. For example, the interaction record and the unified interaction record may be sent to a process improvement team associated with the network. The process improvement team may use the sequence information, read from the interaction record and/or unified interaction record, to identify misdirects, to determine the root cause for conditions, improve training programs for customer service agents, to reduce the time associated with handling calls, to automate portions of unified customer service operations, to optimize transfer patters to reduce queue times, etc.

Figure 2:
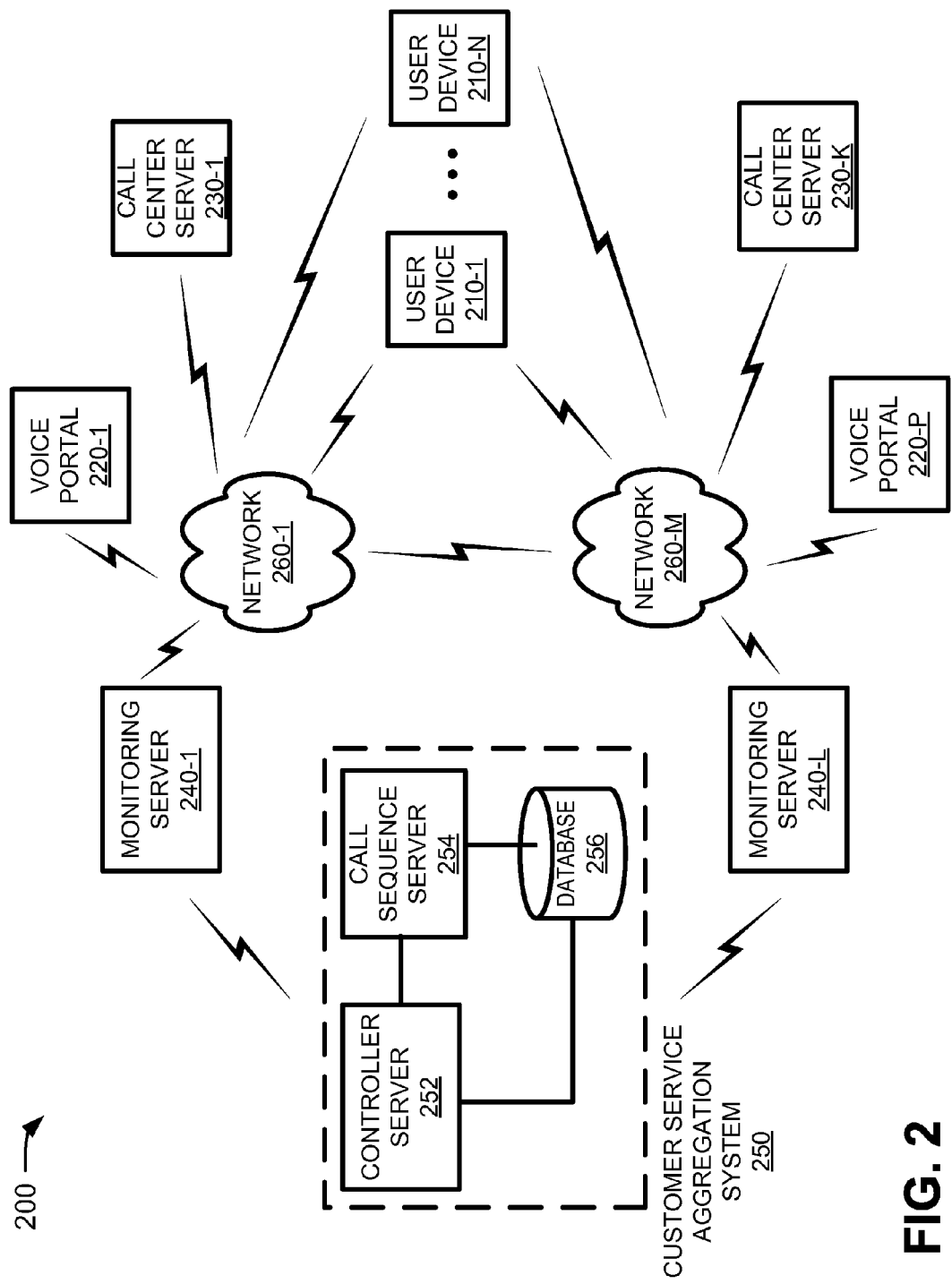
FIG. 2 is a diagram of an exemplary network in which systems and/or methods described herein may be implemented.

FIG. 2 is a diagram of an exemplary network 200 in which systems and/or methods described herein may be implemented. As shown in FIG. 2, network 200 may include user devices 210-1, . . . , 210-N (where N≧1) (hereinafter collectively referred to as "user devices 210" or individually as "user device 210"), voice portal servers 220-1, . . . , 220-P (where P≧1) (hereinafter collectively referred to as "voice portal servers 220" or individually as "voice portal server 220"), call center servers 230-1, . . . , 230-K (where K≧1) (hereinafter collectively referred to as "call center servers 230" or individually as "call center server 230"), monitoring servers 240-1, . . . , 240-L (where L≧1) (hereinafter collectively referred to as "monitoring servers 240" or individually as "monitoring server 240"), customer service aggregation system 250 (hereinafter referred to as "aggregation system 250"), controller server 252, call sequence server 254, database 256, and networks 260-1, . . . , network 260-M (where M≧0.1) (hereinafter referred to collectively as "networks 260" or individually as "network 260").

A group of user devices 210, a group of voice portal servers 220, a group of call center servers 230, a group of monitoring servers 240, a single aggregation system 250, a single controller server 252, a single call sequence server 254, a single database 256 and a group of networks 260 are illustrated in FIG. 2 for simplicity. In practice, there may be additional, fewer, different or differently arranged user devices 210, voice portal servers 220, call center servers 230, monitoring servers 240, aggregation systems 250, controller servers 252, call sequence servers 254, databases 256, and networks 260.

Also, in some implementations, one or more of the devices of network 200 may perform one or more functions described as being performed by another one or more of the devices of network 200. For example, controller server 252, call sequence server 254, and/or database 256 may be integrated into a single device. In another example, monitoring server 240 and call center server 230 may be integrated into a single device. Components of network 200 may interconnect via wired connections, wireless connections, or a combination of wired and wireless connections.

User device 210 may include any computation or communication device, such as a wired communication device or a wireless mobile communication device that is capable of communicating with voice portal server 220 and/or call center server 230. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set top box (STB), a television, a camera, a personal gaming system, or another type of computation or communication device. In one implementation, user device 210 may place calls to voice portal server 220 and/or may communicate with a call center server 230 for customer service assistance.

The description to follow will generally refer to user device 210 as a wireless mobile communication device. The description is not limited, however, to a wireless mobile communication device and may equally apply to other types of user devices.

Voice portal server 220 may include one or more server devices, or other types of computation or communication devices, that gather, process, search, store, and/or provide information in a manner similar to that described herein. For example, voice portal server 220 may include a computer device that operates an IVRU. Voice portal server 220 may interface with user device 210, call center server 230, monitoring server 240 and/or aggregation system 250.

Voice portal server 220 may interact with user device 210. For example, voice portal server 220 may receive calls from user device 210, may interact with user device 210 and/or may transfer calls to call center server 230 and/or other voice portal servers 220. In one implementation, voice portal server 220 may be an IVRU that may interact with user device 210 using speech recognition techniques. For example, voice portal server 220 may receive a call from user device 210, may present a voice menu to user device 210 for the user (e.g., the user of user device 210) to listen to, and/or may instruct the user to select a menu item that is associated with the purpose of the call. Voice portal server 220 may receive a selection from user device 210 by recognizing the selection spoken by the user. Additionally, or alternatively, voice portal server 220 may receive the selection from user device 210 when the user presses a particular button or buttons on user device 210. Voice portal server 220 may, in response to the selection received from the user, present a recorded voice message to user device 210 for the user to listen to (e.g., address information if, for example, the user desired information about where to send a payment). In another example, voice portal server 220 may transfer the call to call center server 230 if voice portal server 220 is not able to provide information, a remedy and/or a particular action desired by the user.

Voice portal server 220 may communicate with monitoring server 240. For example, voice portal server 220 may send, to monitoring server 240, sequence information associated with call handling operations performed by voice portal server 220 while interacting with user device 210. In another example, voice portal server 220 may permit monitoring server 240 to listen to (e.g., monitor and/or record) the call handling operations.

Call center server 230 may include one or more server devices, or other types of computation or communication devices, that gather, process, search, store, and/or provide information in a manner similar to that described herein. Call center server 230 may interface with user device 210, voice portal server 220, monitoring server 240 and/or aggregation system 250. Call center server 230 may perform customer service operations. For example, call center server 230 may receive a call from user device 210 (e.g., directly from user device 210, via a transfer from voice portal server 220, and/or via a transfer from another call center server 230) and may place the call in a queue (e.g., a queue associated with call center server 230) until a customer service agent, associated with call center server 230, answers the call. Additionally, or alternatively, call center server 230 may receive sequence information associated with the call from aggregation system 250 and may present the sequence information and/or other information associated with the call for display to be viewed by the customer service agent. Call center server 230 may transfer the call to another call center server 230, voice portal server 220, and/or may terminate the call if the customer service agent was able to remedy the user's problem.

Call center server 230 may communicate with monitoring server 240. For example, call center server 230 may send sequence information, associated with call handling operations (e.g., interactions between user device 210 and call center server 230) performed by call center server 230, to monitoring server 240. In another example, call center server 230 may permit monitoring server 240 to listen to (e.g., to monitor and/or to record) the call handling operations.

Monitoring server 240 may include one or more server devices, or other types of computation or communication devices, that gather, process, search, store, and/or provide information in a manner similar to that described herein. Monitoring server 240 may interface with user voice portal server 220, call center server 230, and/or aggregation system 250.

Monitoring server 240 may perform a registration operation. For example, monitoring server 240 may communicate with voice portal server 220, call center server 230, and/or other devices associated with network 200 to establish an association that enables monitoring server 240 to perform listening operations associated with calls handled by voice portal server 220, call center server 230, and/or other devices associated with network 200. Monitoring server 240 may send information corresponding to which devices, within network 200, monitoring server 240 is associated and may send the registration information to aggregation system 250.

Monitoring server 240 may perform listening operations. For example, monitoring server 240 may perform listening operations that may include receiving and/or recording sequence information and/or other information (e.g., voice, text, video, etc.) associated with calls being handled by voice portal server 220, call center server 230, and/or other devices associated with network 200. Monitoring server 240 may convert and/or translate information received from devices with which monitoring server 240 is associated into a particular protocol, format, and/or standard that may be received and/or processed by aggregation system 250.

Aggregation system 250 may include one or more server devices, or other types of computation or communication devices, that gather, process, search, store, and/or provide information in a manner similar to that described herein. Aggregation system 250 may interface with voice portal server 220, call center server 230, and/or monitoring server 240. For example, aggregation system 250 may interface with monitoring server 240 to perform registration operations. In another example, aggregation system 250 may receive sequence information from monitoring server 240 and may store the sequence information in an interaction record associated with calls being received and/or processed by network 200. Aggregation system 250 may use the sequence information to determine whether a condition, associated with a call, is present, such as a misdirected transfer, a quantity of transfers that exceeds a transfer threshold, and/or a quantity of time, associated with call handling, that exceeds a time threshold). Aggregation system 250 may communicate with voice portal server 220, call center server 230, and/or monitoring server 240 to trigger a customer service operation to remedy a condition associated with a call being handled by network 200. Aggregation system 250 may interact with a process improvement team (e.g. by sending sequence information, by sending a notification that condition has been determined to exist, and/or by sending other information associated with call, the user, user device 210, etc.) that may cause the process improvement team to perform a process improvement operation to remedy the condition and/or to reduce the frequency of reoccurrence of the condition.

Aggregation system 250 may include controller server 252, call sequence server 254 and/or database 256. Controller server 252 may include one or more server devices, or other types of computation or communication devices, that gather, process, search, store, and/or provide information in a manner similar to that described herein. In another implementation, controller server 252 may include a processor, a microprocessor, or some form of hardware logic (e.g., an application specific integrated circuit (ASIC) or a field programmable gate array (FPGA)).

Controller server 252 may perform registration operations. For example, controller server 252 may instruct monitoring server 240 to register with controller server 252 and controller server 252 may receive registration information. The registration information may include information associated with network devices (e.g., voice portal server 220, call center servers 230 and/or other network devices) with which monitoring server 240 is associated (e.g., via the registration process). Controller server 252 may use the registration information to generate a network topology associated with network 200. The network topology may include information associated with each network device (e.g., voice portal server 220, call center server 230, etc.) and/or a corresponding monitoring server 240 associated with each network device.

In another implementation, aggregation system 250 may include a registration server via which the registration operation, described above, may be performed by a registration server (not shown in FIG. 2). For example, a registration server may instruct monitoring server 240 to register with the registration server and the registration server may receive registration information that may be used to generate information associated with the network topology. The registration server may send the registration information to controller server 252 and/or may store the registration information in database 256.

Controller server 252 may generate an interaction record. For example, aggregation system 250 may receive sequence information from monitoring server 240. Controller server 252 may generate an interaction record and may store the sequence information, associated with each call being handled by the network devices in network 200, in an interaction record. Controller server 252 may send information associated with the interaction record to the call sequence server 254 and may receive a unified interaction record (described below) associated with each call. Controller server 252 may use the unified interaction record to determine whether a condition exists in network 200.

Controller server 252 may perform a customer service operation. For example, controller server 252 may determine, from the information read from the unified interaction record, whether a condition, associated with a particular call, exists within network 200 (e.g., a misdirected transfer, a quantity of transfers that exceeds a transfer threshold, a duration of the call that exceeds a time threshold, and/or a quantity of waiting time that exceeds another time threshold).

Call sequence server 254 may include one or more server devices, or other types of computation or communication devices, that gather, process, search, store, and/or provide information in a manner similar to that described herein. In another implementation, call sequence server 254 may include a processor, a microprocessor, or some form of hardware logic (e.g., an ASIC or a FPGA). Call sequence server 254 may interface with controller server 252 and/or database 256. Call sequence server 254 may receive information associated with an interaction record and may perform an operation that processes the information, associated with each call identified in the interaction record, to generate a unified interaction record. Generally, a unified interaction record may be a record that includes information associated with the manner in which the call has been handled (e.g., the quantity of transfers, the network devices associated with handling the call, the duration of the call, the quantity of time the call was on hold, etc.) as measured from a point in time that the call was received. Call sequence server 254 may send information associated with the unified interaction record to controller server 252.

Database 256 may include a device to write, read and/or store information. For example, database 256 may interface with controller server 252 and/or call sequence server 254 and may store information associated with a network topology associated with network 200, an interaction record, a unified interaction record, etc.

Network 260 may include a communications network, such as a wide area network (WAN), a metropolitan area network (MAN), a telephone network (e.g., the Public Switched Telephone Network (PSTN), or a cellular network, such as the Public Land Mobile Network (PLMN), and/or a 2G, a 3G, and/or a 4G network), an ad hoc network, an intranet, the Internet, a fiber optic-based network (e.g., a fiber optic service (FiOS) network), or a combination of networks. Additionally, or alternatively, network 260 may include a broadband network, a service provider network and/or a carrier network.

Although not shown in FIG. 2, network 200 may include other devices, such as an authentication server, etc. Each device may perform certain functions described briefly below. Any of the functions may be performed by voice portal server 220, call center server 230, and/or aggregation system 250. Thus, one or more of the devices may be integrated into voice portal server 220, call center server 230, and/or aggregation system 250.

The authentication server may include one or more server devices, or other types of computation or communication devices, that authenticates user device 210. For example, the authentication server may receive a request to authenticate user device 210 based on information associated with voice portal server 220 (e.g., an identifier associated with voice portal server 220), information associated with a user of user device 210 (e.g., username, password, email address, PIN, etc.), and/or information associated with user device 210 (e.g., an identifier associated with user device 210).

Figure 3:
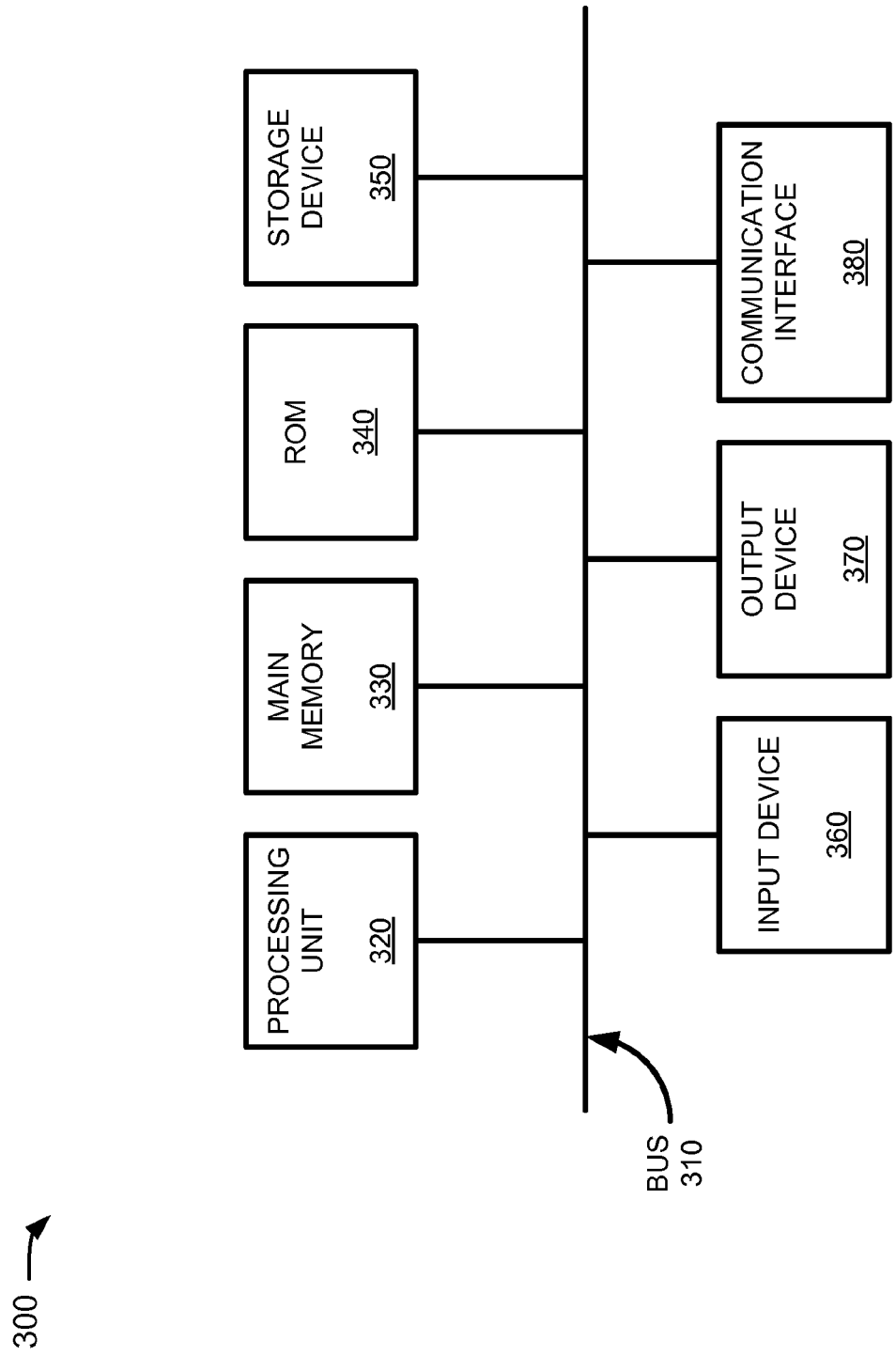
FIG. 3 is a diagram of exemplary components of one or more of the devices of FIG. 2.

FIG. 3 is a diagram of exemplary components of a device 300 that may be associated with voice portal server 220, call center server 230, monitoring server 240, aggregation system 250, controller server 252, and/or call sequence server 254. Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as network 260.

As will be described in detail below, device 300 may perform certain operations relating to unified customer service interactions. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
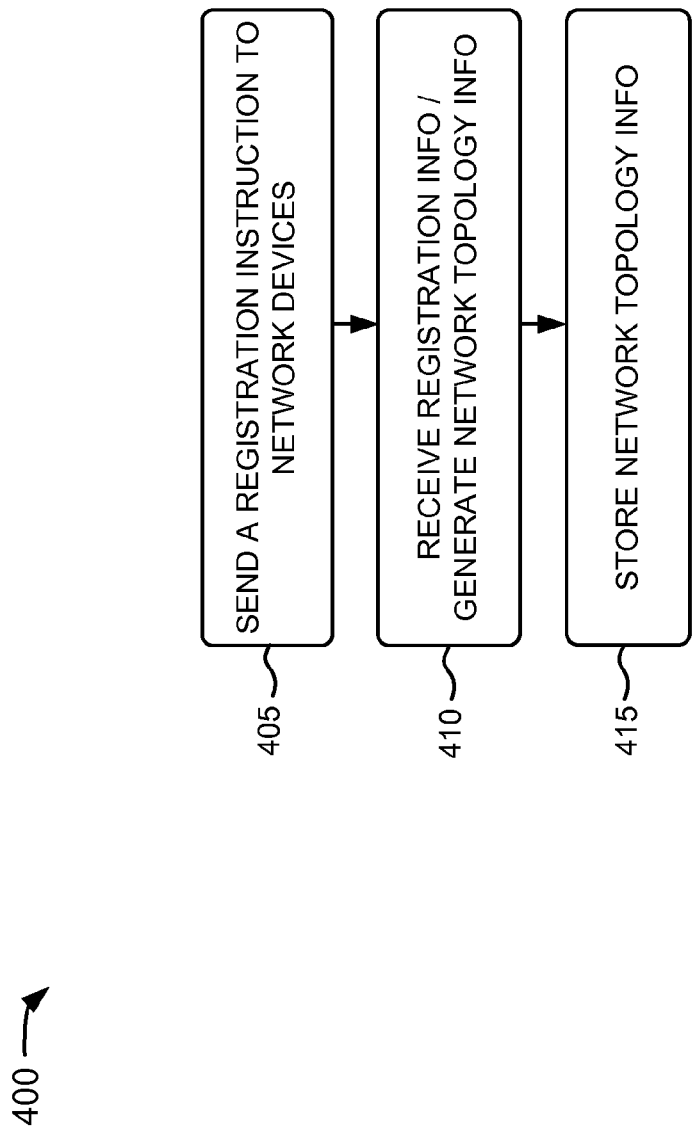
FIG. 4 is a flowchart of an exemplary process for registering network devices with an aggregation system within an exemplary portion of the network of FIG. 2.

FIG. 4 is a flowchart of an exemplary process 400 for registering network devices with an aggregation system within an exemplary portion of network 200. In one implementation, process 400 may be performed by aggregation system 250. In another implementation, some or all of process 400 may be performed by a device or collection of devices separate from, or in combination with, aggregation system 250.

Process 400 of FIG. 4 may include sending a registration instruction to network devices (block 405). For example, aggregation system 250 may send a registration instruction to voice portal server 220, call center server 230 and/or monitoring server 240. In this example, monitoring server 240 may receive the registration instruction and may communicate with a particular voice portal server 220, with which monitoring server 240 is connected, to establish an association that may enable monitoring server 240 to receive, monitor, and/or record information associated with calls handled by voice portal server 220. The information associated with the calls may include sequence information (e.g., call identifiers, user device identifiers, network device identifiers, telephone numbers, transfer telephone numbers, etc.), information associated with users (e.g., username, password, personal identification number (PIN), etc.), and/or data (e.g., text, voice, audio, and/or video data). In another example, monitoring server 240 may receive the registration instruction and may communicate with a particular call center server 230, with which monitoring server 240 is connected, to establish an association that may enable monitoring server 240 to perform listening operations associated with calls handled by call center server 230 (e.g., to receive, monitor, process, and/or record information associated with calls).

Registration information may be received and network topology information may be generated (block 610). For example, monitoring server 240 may receive the registration information from voice portal server 220 and/or call center server 230 and may forward the registration information to aggregation system 250. The registration information may include information associated with monitoring server 240 (e.g., a device identifier) and information associated with each voice portal server 220 and/or each call center server 230 with which monitoring server 240 is associated. Aggregation system 250 may receive the registration information from each monitoring server 240 associated with network 200 and may generate network topology information associated with network 200.

Network topology information may be stored (block 615). For example, network topology information generated by aggregation system 250 may be stored (e.g., in database 256) and aggregation system 250 may send a notification to monitoring servers 240 to begin performing listening operations with respect to the calls handled by the network devices (e.g., voice portal server 220, call center server 230, and/or other network devices).

Figure 5:
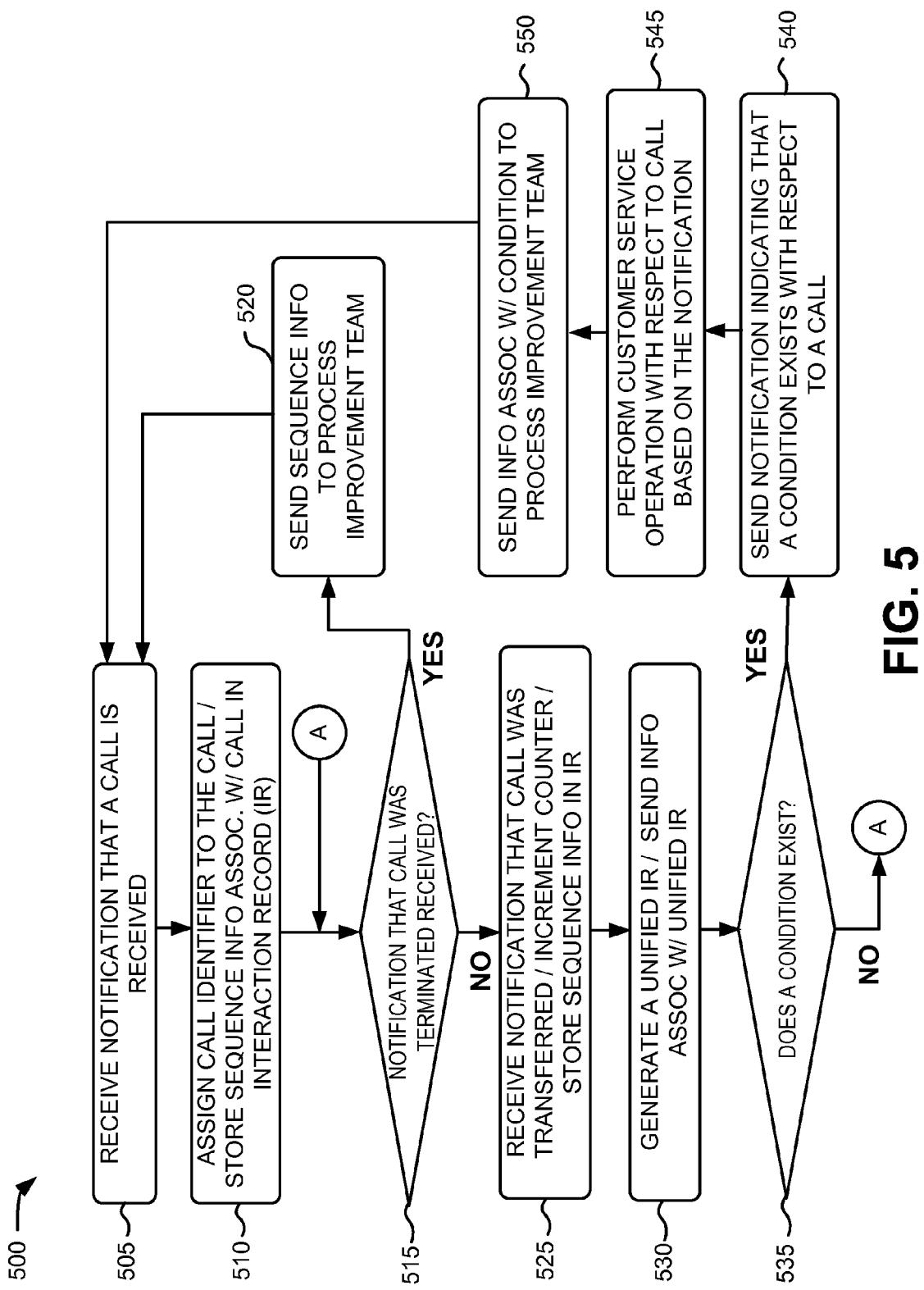
FIG. 5 is a flowchart of an exemplary process for unifying customer service interactions within an exemplary portion of the network of FIG. 2.
Figure 6:
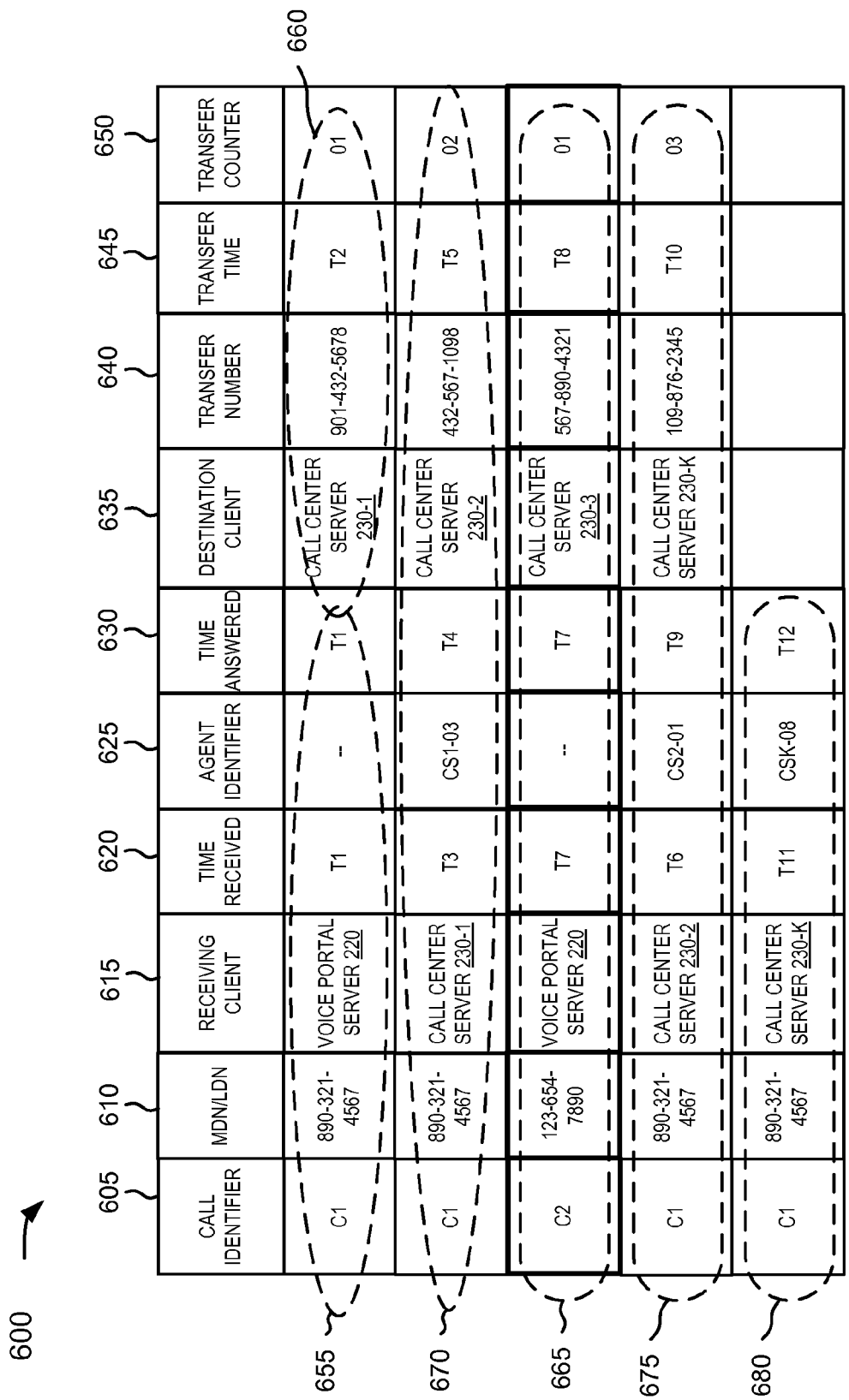
FIG. 6 is a diagram of an exemplary customer service interaction record capable of being used within the network of FIG. 2.

FIG. 5 is a flowchart of an exemplary process 500 for performing unified customer service operations within an exemplary portion of network 200. In one implementation, process 500 may be performed by aggregation system 250. In another implementation, some or all of process 500 may be performed by a device or collection of devices separate from, or in combination with, aggregation system 250. FIG. 6 is a diagram of an exemplary interaction record 600 capable of being used within network 200. FIGS. 7A and 7B are diagrams of exemplary unified interaction records 700 and 730, respectively, that are capable of being used within network 200. A portion of process 500, of FIG. 5, will be discussed below with corresponding references to interaction record 600, shown in FIG. 6, and unified interaction records 700 and 730 shown in FIGS. 7A and 7B, respectively.

Process 500, of FIG. 5, may include receiving a notification that a call is received (block 505). Assume that a registration operation has been performed, in a manner similar to that described above (with respect to blocks 405-415 of FIG. 4), and that network topology information has been generated and stored (e.g., in database 256). For example, voice portal server 220 may receive a call from user device 210 and may present a voice menu to user device 210. The voice menu may instruct the user to choose a menu item that most closely addresses the purpose of the call (e.g., for account balance information, to receive an address to which correspondence may be sent, to pay a bill, to remedy a problem, to speak to a customer service agent, etc.). The user may make a selection by pressing a button on the user device corresponding to a particular menu item. In another implementation, the user may speak the desired selection into user device 210. Voice portal server 220 may received the selection and may use speech recognition techniques to process the selection.

A particular monitoring server 240 (e.g., monitoring server 240-1 associated with voice portal server 220 via registration process 400 of FIG. 4) may communicate with voice portal server 220 and may obtain sequence information associated with the call. The sequence information may include information associated with user device 210 from which the call was received (e.g., a device identifier, mobile device number (MDN), and/or landline device number (LDN), etc.), information associated with the user (e.g., username, password, PIN, etc.), information associated with the receiving client (e.g., an identifier associated with voice portal server 220), information associated with the selection (e.g., text, voice and/or video data), and/or information associated with the time that the call was received (e.g., T1). Monitoring server 240-1 may send a notification that a call was received to aggregation system 250. The notification may include the sequence information. Aggregation system 250 may receive, from monitoring server 240-1, the notification that the call was received.

In another implementation, the sequence information, received by aggregation system 250, may not include information associated with a receiving client (e.g., voice portal server 220). For example, aggregation system 250 may receive the sequence information (e.g., without information associated with the receiving client) from monitoring server 240-1 and may use the topology information, obtained from the registration process described above (with respect to FIG. 4) to identify the receiving client (e.g., voice portal server 220) associated with monitoring server 240-1.

A call identifier may be assigned to the call and sequence information associated with the call may be stored in an interaction record (block 510). For example, aggregation system 250 may receive the notification that the call was received and may assign a call identifier (e.g., C1) to the call. Additionally, or alternatively, aggregation system 250 may store the sequence information, received from monitoring server 240-1, in an interaction record (e.g., interaction record 600 of FIG. 6). For example, interaction record 600 may include call identifier field 605, MDN/LDN field 610, receiving client field 615, time received field 620, agent identifier field 625, time answered field 630, destination client field 635, transfer number field 640, transfer time field 645, and/or transfer counter field 650. While FIG. 6 illustrates an interaction record, that includes certain fields, such as fields 605-650, in another implementation, an interaction record may include fewer fields, additional fields, different fields or differently arranged fields than are described with respect to FIG. 6.

Call identifier field 605 may include an identifier associated with a particular call received by a network device (e.g. voice portal servers 220, call center servers 230, etc.). MDN/LDN field 610 may include information regarding a telephone number associated with user device 210 from which the particular call was placed. Receiving client field 615 may include information associated with a network device that receives the particular call (e.g., from user device 210 and/or from another network device when the particular call is transferred). Time received field 620 may include information associated with a time that the particular call is received and/or placed in a queue associated with the receiving client. Agent identifier field 625 may include information associated with a customer service agent that handles the particular call. Time answered field 630 may include information associated with a time that a customer service agent answers the particular call. Destination client field 635 may include information associated with a network device to which the particular call is transferred. Transfer number field 640 may include information regarding a telephone number associated with the destination client. Transfer time field 645 may include information associated with a time at which the particular call is transferred; and/or transfer counter field 650 may include information associated with the quantity of transfers associated with the particular call.

In this example, the sequence information stored in the interaction record, as shown by ellipse 655 of FIG. 6, may include the particular call identifier (e.g., C1) assigned to the call by aggregation system 250 and/or a particular MDN/LDN (e.g., 890-321-4567) associated with user device 210 that place the call. Additionally, or alternatively, the interaction record may include information associated with the particular receiving client that received the call (e.g., voice portal server 220) and/or the particular time that the call was received by the receiving client (e.g., T1) (as shown by ellipse 655).

Returning to FIG. 5, if a notification that the call was terminated is received (block 515—YES), then the sequence information may be sent to a process improvement team (block 520). For example, voice portal server 220 may receive a selection from user device 210 and may automatically provide information (e.g., recorded information) to user device 210 in response to the selection. User device 210 may receive the selection and the user may terminate the call by pressing a particular button on user device 210 and/or by indicating a desire to terminate the call by speaking into user device 210. Monitoring server 240-1 may communicate with voice portal server 220 and may obtain sequence information that includes an indication that the call is terminated, information associated with the time that the call was terminated, and/or information associated with call handling by voice portal server 220 (e.g., the menu items selected by the user, the recorded response sent to the user, etc.).

Sequence information may be sent to a process improvement team. For example, aggregation system 250 may receive the notification that the call was terminated and may send the sequence information, read from the interaction record and/or the sequence information associated with the notification that the call was terminated, to a process improvement team associated with network 200. The process improvement team may use the sequence information to detect certain conditions associated with the manner in which calls are handled by network devices, to determine root causes for conditions, and/or to improve processes associated with unified customer service operations. Whether a condition associated with a misdirected call exists may be determined. For example, aggregation system 250 may determine that a condition is present when a call is transferred to the wrong destination client (e.g., a misdirected call). In this example, if a call associated with a billing question is to be transferred to a particular destination client (e.g., call center server 230-3), but the call is instead transferred to a destination client that is different than the particular destination client (e.g., call center server 230-1), then the process improvement team may determine that a condition associated with the call was present.

Sequence information may be used by the process improvement team to determine the root cause for certain conditions. For example, the process improvement team may use the sequence information to determine the root causes associated with conditions (e.g., the misdirected call condition described above) and/or to reduce the recurrence of conditions at some future point in time, to improve training programs for customer service agents, to reduce the time associated with handling calls, to automate portions of unified customer service operations, to optimize transfer patterns, to reduce waiting times for users, to reduce the quantity of transfers, etc.

If a notification that the call was terminated is not received (block 515—NO), then a notification that the call was transferred may be received, a transfer counter may be incremented, and/or sequence information may be stored in the interaction record (block 525). For example, voice portal server 220 may receive a particular selection from user device 210 and may use the selection to determine to which destination client the call may be transferred. If, for example, voice portal server 220 receives a selection corresponding to a request to speak with a billing agent, voice portal server 220 may transfer the call to a particular destination client (e.g., call center server 230-1) with which a billing agent is associated. More particularly, voice portal server 220 may retrieve a telephone number associated with the particular destination client and may use the telephone number to transfer the call to the particular destination client (e.g., call center server 230-1).

Monitoring server 240-1 may, in a manner similar to that described above, obtain sequence information, associated with the transferred call and may send, to aggregation system 250, a notification that the call, associated with a particular identifier (e.g., C1), was transferred. Aggregation system 250 may receive the notification and may increment a transfer counter regarding a quantity of transfers associated with the call (e.g., from zero to one). Aggregation system 250 may store, in the interaction record, sequence information associated with the transferred call, such as the sequence information received from monitoring server 240-1 and/or the information regarding the quantity of transfers associated with the call obtained from the transfer counter. For example, as shown by ellipse 660 of FIG. 6, interaction record 600 may include the particular destination client to which the call was transferred (e.g., call center server 230-1), a particular telephone number associated with call center server 230-1 (e.g., 901-432-5678) used to transfer the call, a particular time when the call was transferred (e.g., T2), and/or the quantity of transfers associated with the call (e.g., 01).

It should be understood that sequence information from other calls may be stored in the interaction record. For example, as shown by ellipse 665 of FIG. 6, aggregation system 250 may store, in the interaction record 600, sequence information associated with other calls, such as another call (e.g., associated with call identifier C2) received by a receiving client (e.g., voice portal server 220) from another user device 210 (e.g., with an MDN and/or LDN of 123-654-7890) at a particular time (e.g., T6). Additionally, or alternatively, the sequence information associated with the other call may include sequence information indicating that the other call was transferred to a destination client (e.g., to call center server 230-3) at another particular time (e.g., T6) using a transfer number associated with the destination client (e.g., 567-890-4321) and that aggregation system 250 incremented a transfer counter, associated with the other call (e.g., from zero to one) (shown by ellipse 665).

A unified interaction record may be generated and information associated with the unified interaction record may be sent (block 530). For example, aggregation system 250 may generate a unified interaction record (e.g., unified interaction record 700 of FIG. 7A) associated with a call (e.g., the call associated with all identifier C1) based on sequence information obtained from network devices, via monitoring servers 240, that handled the call. More particularly, the unified interaction record may include sequence information received from each network device from the point in time that the call was received (e.g., by voice portal server 220) to a later point in time that the call was transferred to the destination client that is currently handling the call (e.g., call center server 230-1). For example, unified interaction record 700 may include fields 605 through 620 as described above with respect to interaction record 600 of FIG. 6 and additionally, or alternatively, may include current destination client field 702, current transfer number field 704, current handling time field 706, total transfers field 708, total time in queue field 710, and/or time terminated field 712. While FIG. 7A illustrates a unified interaction record that includes fields 605-620 and/or fields 702 through 712, in another implementation, a unified interaction record information may include fewer fields, additional fields, different fields or differently arranged fields than are described with respect to FIG. 7A.

As shown by ellipse 714 (FIG. 7A), fields 605 through 620 may include sequence information associated with the call (e.g., the call associated with call identifier C1) as described above (with respect to blocks 505 and 510). Additionally, or alternatively, current destination client field 702 may contain information associated with the destination client that is handling the call (e.g., call center server 230-1); current transfer number field 704 may include information associated with a telephone number corresponding to the destination client (e.g., 901-432-5678); handling time field 706 may include information associated with a time when the call was transferred to the destination client (e.g., T2); and total transfers field 708 may include information associated with a quantity transfers associated with the call. In one implementation, the quantity of transfers may be obtained from a transfer counter. In another implementation, the quantity of transfers may be determined, from the unified record, based on the quantity of network devices that handled the call, Total time in queue field 710 may include information associated with the total amount of time the call was held in the queue (e.g., from a time that the call was put on hold to the time when the call is answered by a customer service agent) and time terminated field 712 may include information associated with a particular time when the call was terminated (e.g., when the user, a customer service agent, or a network device ends the call) (e.g., as shown by ellipse 714).

In another implementation, aggregation system 250 may store information associated with the purpose of the call in the unified interaction record (not shown in FIG. 7A). For example, aggregation system 250 may store a code, corresponding to the purpose of the call (e.g., a purpose associated with billing, etc.), in the unified interaction record associated with the call. In another example, aggregation system 250 may store a particular menu item, selected by the user during the interaction with the receiving client (e.g., voice portal server 220) and/or with another network device (e.g., call center server 230), in the interaction record. In yet another example, aggregation system 250 may store a data file (e.g., a text, voice, video, and/or other data file), associated with the call, that includes data associated with the interactions between the user device 210 and the receiving client (e.g., voice portal server 220), the destination device (e.g., call center server 230), and/or a customer service agent associated with the destination device.

Information read from the unified interaction record may be sent to a destination client and/or a customer service agent handling a call. For example, aggregation system 250 may read information from the unified interaction record associated with a particular call (e.g., the call associated with call identifier C1) and may send the information to a customer service agent, associated with the destination client (e.g., call center server 230-1), that is handling the call. The customer service agent may use the information to assist the user of user device 210. For example, the customer service agent may, using the information obtained from the unified interaction record, become aware of the purpose of the call (e.g., a billing question), the quantity of times that the call has been transferred, the amount of time that the user has been on hold, etc. Additionally, or alternatively, the customer service agent may use the information to gauge the level of stress and/or degree of satisfaction regarding of the user, to determine whether the call has been misdirected, to determine to which destination client and/or customer service agent to transfer a misdirected call, etc.

In another implementation, information associated with a user and/or user device may be sent to a destination client and/or customer service agent handling the call. For example, information associated with a user and/or user device 210, such as information associated with a user profile, information associated with a user account, and/or information associated with the purpose of the call, etc. may be retrieved (e.g., from database 256) by aggregation system 250 and may be sent to a destination client (e.g., call center server 230 and/or another network device) handling the call. In one example, aggregation system 250 may retrieve, from a memory (e.g., database 256), information associated with a user profile that may include information about a service provider plan (e.g., terms and conditions, user settings, type of user device, etc.) and may send the information to a destination client and/or customer service agent handling the call. In another example, aggregation system 250 may retrieve information associated with an account (e.g., billing information, account balance, payment information, etc.) from the memory and/or from a particular network device associated with billing, etc. and may send the information associated with the account to a destination client and/or customer service agent handling the call. In yet another example, aggregation system 250 may obtain information associated with the purpose of the call (e.g., in a manner described above) and may send the information associated with the purpose of the call to a particular destination client and/or customer service agent that is handling the call.

If a condition is not detected (block 535—NO), and a notification that the call was terminated is received (block 515—YES), then sequence information may be sent to the process improvement team (block 520). For example, aggregation system 250 may determine, from information obtained from the unified interaction record (e.g., unified interaction record 700 of FIG. 7A), whether a condition, associated with a particular call, is present. More particularly, aggregation system 250 may determine that a condition, associated with a call (e.g., C1) is not present if the quantity of transfers (e.g., 01) (as shown by ellipse 714 of FIG. 7A), is below a particular transfer threshold (e.g., 0, 1, 2, 3, etc.). In another example, aggregation system 250 may determine that a condition, associated with the call, is not present if the total time in queue, such as a measure of the total time that the call is put on hold (e.g., 0) (as shown by ellipse 714), is below a particular time threshold. In yet another example, aggregation system 250 may determine that a condition, associated with the call, is not present when the duration that the call (e.g., based on the time the call is received (T1) to the time the call is transferred (T2)) is less than another particular time threshold. Aggregation system 250 may, in a manner similar to that described above, send sequence information associated with the call (e.g., the call associated with call identifier C1) to a process improvement team associated with network 200.

If a condition is not detected (block 535—NO), and a notification that the call was terminated is not received (block 515—NO), then another notification that the call was transferred may be received, the transfer counter may be incremented, and sequence information may be stored in the interaction record (block 525). For example, as described above, voice portal server 220 may transfer the call to call center server 230-1 (e.g., at a time associated with T2). Call center server 230-1 may receive the call (e.g., the call associated with C1), at a particular time (e.g., T3) and may place the received call in a queue until a customer service agent, associated with call center server 230-1, answers the call (e.g. at time T4).

The customer service agent may communicate (e.g., by voice, text, video, etc.) with the user associated with user device 210 from which the call (e.g., the call associated with call identifier C1) was received, to answer a question posed by the user, to remedy a problem identified by the user, etc. In one example, the customer service agent may assist the user and the call may be terminated. Additionally, or alternatively, aggregation system 250 may receive the sequence information associated with the call from call center server 230-1 via monitoring server 240-2 and/or may forward the sequence information to the process improvement team in a manner similar to that described above with respect to blocks 515—YES and 520).

In another example, the customer service agent may determine that another customer service agent, associated with another destination client (e.g., call center server 230-2) is equipped to assist the user. Additionally, or alternatively, the customer service agent may obtain information associated with a telephone number corresponding to the other destination client and/or may transfer the call to the other destination client (e.g., at time T5).

Sequence information may be obtained from the destination client. For example, monitoring server 240-2, associated with call center server 230-1 via the registration process described above (with respect to FIG. 4), may communicate with call center server 230-1 to obtain sequence information associated with the transferred call (e.g., the call associated with call identifier C1). Monitoring server 240-2 may send a notification, associated with the call transfer to aggregation system 250. Aggregation system 250 may receive the notification, may increment the transfer counter associated with the call (e.g., from one to two), and/or may store the sequence information in the interaction record.

Sequence information from the destination client may be stored in the interaction record. For example, aggregation system 250 may receive the notification and may store the sequence information in the interaction record. For example, as shown in FIG. 6 (e.g., by ellipse 670), interaction record 600 may include a call identifier associated with the transferred call (e.g., C1); the MDN/LDN associated with user device 210 (e.g., 890-321-4567) that placed the call; information associated with a receiving client (e.g., call center server 230-1) that received the call associated with the first transfer (e.g., from voice portal server 220); information associated with a time that the transferred call was received by the receiving client and/or placed in the queue (e.g., T3); information associated with a time that the call was answered by a customer service agent (e.g., T4); and/or information associated with the customer service agent that answered the transferred call (e.g., CS1-03). Additionally, or alternatively, sequence information stored in interaction record 600 may include information associated with a destination client (e.g., call center server 230-2), information associated with a telephone number corresponding to the destination client (e.g., 432-567-1098), information associated with a time that the transfer occurred (e.g. T5), and/or information obtained from the transfer counter (e.g., 02) associated with the call (e.g., the call associated with call identifier C1) (as shown by ellipse 670).

Assume that aggregation system 250, generates a unified interaction record in a manner similar to that described above with respect to block 530 and determines, in a manner similar to that described above (with respect to block 535—NO), that a condition does not exist with respect to the call (e.g., the call associated with call identifier C1). Assume further that the call is transferred from call center server 230-2 to another destination client (e.g. call center server 230-K), that sequence information is obtained from call center server 230-2 (e.g., by monitoring server 240-3) and from call center server 230-K (e.g., by monitoring server 240-L). Assume yet further that aggregation system 250 incremented the transfer counter associated with the call (e.g., from two to three) and stored sequence information from monitoring servers 240-3 and/or 240-L in the interaction record.

For example, as shown in FIG. 6 (e.g., by ellipse 675), interaction record 600 may include a call identifier associated with the transferred call (e.g. C1); the MDN/LDN associated with user device 210 (e.g., 890-321-4567) that placed the call; information associated with a receiving client (e.g., call center server 230-2) that received the call associated with the second transfer; information associated with a time that the transferred call was received by the receiving client and/or placed in the queue (e.g., T6); information associated with a time that the call was answered by a customer service agent (e.g., T9); and/or information associated with the customer service agent associated with the receiving client (e.g., CS2-01). Additionally, or alternatively, sequence information stored in interaction record 600 may include information associated with a destination client which may be currently handling the call (e.g., call center server 230-K); information associated with a telephone number corresponding to the destination client (e.g., 109-876-2345), information associated with a time that the transfer occurred (e.g. T10), and/or information read from the transfer counter (e.g., 03) associated with the call (e.g., as shown by ellipse 675).

Additionally, or alternatively, interaction record 600 (e.g., as shown by ellipse 680 of FIG. 6) may include sequence information associated with the time (e.g., T11) that the transferred call was received and/or was placed in a queue by call center server 230-K; information associated with the time that the customer service agent, associated with call center server 230-K, answered the call (e.g., T12); and/or information associated with customer service agent identifier (e.g., CSK-08).

A unified interaction record may be generated and information associated with the unified interaction record may be sent (block 530). For example, aggregation system 250 may generate a unified interaction record (e.g., unified interaction record 730 of FIG. 7B) associated with the call and may store sequence information obtained from network devices, via monitoring servers 240, that handled the call throughout the duration of the call. More particularly, the unified interaction record may include sequence information received from each network device from the time that the call was received (e.g., by voice portal server 220), transferred to intermediate destination devices (e.g., call center servers 230-1, call center server 230-2, etc.), and/or transferred to the destination client that is currently handling the call (e.g., call center server 230-K).

Unified interaction record may include information associated with an origin of the call. For example, as shown by ellipse 732 (FIG. 7B), fields 605 through 620 may include sequence information associated with the call (e.g., the call associated with call identifier C1) placed from user device 210 and received by voice portal server 220 as described above (with respect to blocks 505 and 510).

Unified interaction record may include information associated with the manner in which the call has been handled. For example, as shown by ellipse 732 of FIG. 7B, unified interaction record 730 may include information associated with a current destination client (e.g., call center server 230-K) that is handling the call associated with a particular identifier (e.g., C1); information associated with a telephone number regarding the current destination client (e.g., 109-876-2345); information associated with a time when the call was received by the current destination client (e.g., T11); and/or information associated with the total amount of time (e.g., hours (HH), minutes (MM), and/or seconds (SS)) that the call was held in the queue (e.g., when the call was put on hold). For example, information associated with the total time that the call was placed in the queue may be based on the time in queue associated with the first destination client (e.g., from time T3 to T4 as shown by ellipse 670 of FIG. 6), a time in queue associated with the second destination client (e.g., from T6 to T9 as shown by ellipse 675 of FIG. 6), and/or a time in queue associated with the third destination device (e.g., from T11 to T12 as shown by ellipse 680 of FIG. 6). Additionally, or alternatively, unified interaction record 600 may include information associated with a particular time when the call was terminated (e.g., when the user, a customer service agent, or a network device ends the call) (e.g., T13) (as shown by ellipse 732).

If a condition exists (block 535—YES), then a notification indicating that a condition exists with respect to a call may be sent (block 540). For example, aggregation system 250 may determine whether a condition, associated with a call, exists based on a quantity of transfers associated with the call, a duration of the call, a time that the call was in a queue, etc. For example, aggregation system 250 may determine whether a condition, associated with a call (e.g., a call associated with call identifier C1), exists using the information stored in unified interaction record (e.g., unified interaction record 730 of FIG. 7B). In this example, aggregation system 250 may compare the information associated with a quantity of transfers (e.g., 03 as shown by ellipse 732 of FIG. 7B) corresponding to total transfers field 708 (FIG. 7B) with a transfer threshold set by aggregation system 250 and may determine that a condition exists if the information associated with the quantity of transfers exceeds the transfer threshold.

In another example, aggregation system 250 may determine the duration of the call based on the information associated with the time that the call was received (e.g., T1 as shown by ellipse 732 corresponding to time received field 620) by the receiving client (e.g., voice portal server 220) and a current handling time (e.g., T12 as shown by ellipse 732) corresponding to current handling time field 706 (FIG. 7B) associated with current destination client (e.g., call center server 230-K). Aggregation system 250 may compare the duration of the call with a call handling time threshold and may determine that a condition exists if the duration of the call exceeds the call handling time threshold. In another implementation, aggregation may determine the duration of the call (e.g., the call associated with call identifier C1) using a counter. For example, aggregation system 250 may start a counter when aggregation system 250 assigns a call identifier to a call and may read the counter, associated with the call to determine that duration of the call during the period of time in which the call is handled by network devices (e.g., voice portal servers 220, call center servers 230, and/or other network devices).

In yet another example, aggregation system 250 may compare the information associated with a total quantity of time that the call is placed in a queue (e.g., HH:MM:SS as shown by ellipse 732 of FIG. 7B) corresponding to total time in queue field 710 (FIG. 7B), as measured from the time that the call is received by the receiving client (e.g., voice portal server 220), with a total time in queue threshold. Aggregation system 250 may determine that a condition exists if the total time in queue exceeds the total time in queue threshold.

In another implementation, the unified interaction record may include information associated with the time that the call is place in a queue by a particular destination client that handled the call (e.g., call center server 230-1, call center server 230-2, call center server 230-K, etc.). For example, aggregation system 250 may determine the time that the call was placed in the queue by a particular destination client based on the time that the call was received and/or placed in the queue (e.g., T11 associated with call center server 230-K as shown by ellipse 680 of FIG. 6) and the time that the call was answered by a customer service agent (e.g., T12 associated with call center server 230-K as shown by ellipse 680). Aggregation system 250 may determine that a condition exists if the time that a call is placed in a queue, with respect to any destination client, exceeds the time in queue threshold.

Aggregation system 250 may determine that a condition, associated with a particular call, exists and may send a notification. For example, aggregation system 250 may determine, as described above, that a condition exists and may send a notification to network devices, such as voice portal servers 220, call center servers 230, other network devices, customer service agents associated with particular network devices, and/or the process improvement team. The notification may include information associated with the type of condition (e.g., the quantity of transfers exceed the transfer threshold, the duration of the call exceeds the time threshold, the total time in queue exceeds the total time in queue threshold, etc.), sequence information, associated with a particular call with which the condition is associated (e.g., the call associated with call identifier C1), information associated with the purpose of the call (e.g., a billing question), etc.

A customer service operation may be performed with respect to a call based on the notification (block 545). For example, a current destination client that is handling the call (e.g., call center server 230-K) may receive the notification indicating that a condition, associated with the call, exists and may perform a customer service operation in response to the notification. In one example, the call, with which a condition has been determined to exist, may be removed from a queue (e.g., a queue associated with call center server 230-K) and/or may be transferred directly to a customer service agent. In another example, the call, with which a condition has been determined to exist, may be moved to (or near) the front of the queue and, thus, may be the next call answered by a customer service agent associated with the current destination client.

Additionally, or alternatively, the call may be answered by a particular customer agent that is specially trained to handle calls with which a condition has been determined to exist and/or is uniquely authorized to remedy conditions associated with the call. In yet another example, the call may be transferred to a particular destination client that handles calls with which a condition has been determined to exist. Additionally, or alternatively, the particular destination client may include customer services agents specially trained and/or uniquely authorized in a manner described above. In still another example, users, associated with calls with which a condition has been determined to exist, may be offered a form of good will compensation, such as goods, services, and/or discounts as a remedy for the negative user experience due to the additional time and/or level of frustration experienced by the user as a result of the condition. For example, a user may be offered something of value, such as free minutes, no cost extensions to a service provider plan, and/or any other form of value as a form of compensation for the user experience associated with the condition.

In yet another example, if a user is seeking a remedy for and/or assistance with more than one issue, the call may be sent to a customer service representative that may be specially trained and/or authorized to provide assistance with and/or remedies for an array of issues which may minimize or eliminate the need to transfer the call and/or prolong call handling.

In another implementation, aggregation system 250 may determine that a condition exists, as described above, and may assign a priority to the call. For example, aggregation system 250 may determine that a condition, associated with the duration of the call (e.g., when the duration of the call exceeds a call handling time threshold), exists and may assign a particular priority to the call (e.g., a first priority, second priority, third priority, etc.). Aggregation system 250 may send an expedited handling instruction to a destination client currently handling the call to move the call toward the front of the queue (e.g., to the front of the queue and/or near the front of the queue where other first priority calls may exist if a first priority is assigned to the call). In another example, aggregation system 250 may determine that a condition, associated with the quantity of transfers (e.g., when the quantity of transfers exceeds a transfer threshold), exists and may assign a particular priority to the call. Aggregation system 250 may send an expedited handling instruction to a destination client currently handling the call to move the call toward the front of the queue (e.g., to the middle of the queue and/or near the middle of the queue where other second priority calls may exist if a second priority is assigned to the call). In yet another example, aggregation system 250 may, when a particular priority is assigned to the call, send a special handling instruction to a destination client (e.g., call center server 230-K), that is currently handling the call, to transfer the call to a particular customer service agent that has received specialized training in which to handle calls with which a condition is associated.

Information associated with the condition may be sent to the process improvement team (block 550). For example, aggregation system 250 may send information associated with the condition (e.g., sequence information, information obtained from the unified interaction record, and/or other information) to the process improvement team associated with network 200. For example, in a manner similar to that described above (with respect to block 520), sequence information, associated with a call (e.g., a call associated with call identifier C1) may be sent to the process improvement team. Additionally, or alternatively, information may be obtained from the unified interaction record (e.g., unified interaction record 730 of FIG. 7B) and may be sent to the process improvement team. In another example, information associated with the manner in which the condition was remedied, as a result of the customer service operation, may be sent to the process improvement team, such as transfers to a specially trained customer service agent, moving the call (e.g., the call with which the condition is associated) to the front of a queue, a time associated with when the call was terminated, etc. Additionally, or alternatively, data associated with interactions between the user and/or a destination client (e.g., voice data, text data, video data, etc.) may be sent to the process improvement team.

The process improvement team may receive information associated with the condition. For example, the process improvement team may receive the information, from aggregation system 250, and may use the information to review the manner in which conditions are handled by network devices and/or customer service agents, to determine root causes for conditions, and/or to improve processes associated with unified customer service operations. For example, the process improvement team may use the information to determine the root causes associated with conditions, such as a misdirected call condition as described above with respect to block 520, conditions associated with the number of transfers, the quantity of time associated with call handling, the quantity of time a call is on hold, etc. Additionally, or alternatively, the process improvement team may use the information to reduce the recurrence of conditions, to improve training programs for customer service agents, to reduce the time associated with handling calls, to automate portions of unified customer service operations, to optimize transfer patterns to reduce waiting times for users, to reduce the quantity of transfers, etc.

Implementations described herein may provide unified customer service interactions. A registration operation may be performed that associates monitoring servers with network devices that may permit the monitoring servers to obtain sequence information with respect to calls associated with unified customer service interactions. A call, from a user device, may be received by a voice portal server and the voice portal server may present a menu of options from which the user can select. The voice portal server may receive a selection and may transfer the call to a call center server based on the selection. A monitoring server, associated with the voice portal server, may obtain sequence information and may send, to the aggregation system, the sequence information associated with the call received from the voice portal server and/or the sequence information associated with the transfer of the call to the call center server. The aggregation system may store the sequence information in an interaction record.

The aggregation system may send the sequence information to a process improvement team when the call is terminated. The process improvement team may perform operations associated with determining root causes for conditions, automate processes associated with unified customer service operations, improve training for customer service agents, etc. The aggregation system may send the sequence information to the call center server when the call is transferred. The call center server may receive the transferred call and may place the call in a queue until a customer service agent, associated with the call center server, answers the call. Another monitoring server, associated with the call center server, may obtain sequence information associated with the call and may send the sequence information to the aggregation system. The aggregation system may receive the sequence information and may store the sequence information in the interaction record. The aggregation system may, based on the interaction record, generate a unified interaction record associated with the call and may use the unified interaction record to determine whether a condition, associated with the call, exists. Based on the determination, the aggregation system may assign a particular priority to the call based on the type of condition determined to exist and/or the amount of delay associated with the call. The aggregation server may generate a notification indicating that a condition, associated with the call, exists and may, based on the priority assigned to the call, send the notification to the call center server that is handling the call (e.g., a notification to perform a customer service operation to expedite call handling and/or to perform a customer service operation for specialized call handing). The call center server and/or a customer service agent associated with the call center server may perform a particular customer service operation with respect to the call, with which the condition is associated, to remedy the condition. The aggregation system may send the information, associated with the condition, information associated with the unified interaction record and/or sequence information associated with the call, to the process improvement team that may enable process improvement operations to be performed, as described above.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4 and 5, the order of the blocks may be modified in other implementations. Further, non-dependent blocks may be performed in parallel. For example, blocks of FIG. 5 may be performed in a piplelined manner with multiple instances of the pipeline operating at any given point in time. In other words, the aggregation system may be performing a particular operation on a call or a set of calls while performing another operation on another call or set of calls.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a server device, comprising:
receiving, by the server device, first-information associated with a call received by a first server device;
receiving, by the server device, second-information associated with the call, wherein the second-information is associated with processing of the call by the first server device and at least one second server device;
generating, by the server device, a unified record associated with the call, wherein the unified record includes at least some of the first-information and at least some of the second-information;
determining, by the server device and based on the unified record, that a condition exists with respect to an amount of time aggregated for handling of the call; and
sending, by the server device, an instruction to perform a customer operation with respect to the call, responsive to determining that the condition exists, wherein the customer operation includes assigning a priority for the handling of the call and transferring the call from a current customer service agent to a customer service agent corresponding to the assigned priority.

2. The method of claim 1, where generating the unified record associated with the call includes:
   determining a quantity of transfers associated with the call based on the first-information or the second-information; and
   storing the quantity of transfers associated with the call in the unified record.

3. The method of claim 1, where the unified record includes information associated with a time that the call was received; and
   where determining that the condition exists with respect to the call includes:
   determining a duration of the call based on the information associated with the time that the call was received and information associated with a later time;
   comparing the duration of the call with a particular threshold; and
   determining that the condition exists when the duration of the call exceeds the particular threshold.

4. The method of claim 1, where the unified record includes information associated with a period of time that the call was held in a queue; and
   where determining that the condition exists with respect to the call includes:
   comparing the period of time that the call was held in the queue with a particular threshold; and
   determining that the condition exists when the period of time that the call was held in the queue exceeds the particular threshold.

5. The method of claim 1, where the unified record includes information associated with a quantity of transfers associated with the call; and
   where determining that the condition exists with respect to the call includes:
   comparing the quantity of transfers associated with the call with a particular threshold; and
   determining that the condition exists when the quantity of transfers associated with the call exceeds the particular threshold.

6. The method of claim 1, where sending the instruction to perform the customer operation with respect to the call includes:
   sending, to the second server device, the first-information, the second-information, or information associated with the unified record.

7. The method of claim 1, where sending the instruction to perform the customer operation includes:
   determining a type of condition associated with the call based on the determination that the condition exists, the type of condition associated with the call including a first type associated with a duration of the call and a second type associated with a quantity of transfers associated with the call;
   moving the call toward a front of the queue when the type of condition associated with the call is the first type; and
   moving the call toward a middle of the queue when the type of condition associated with the call is the second type.

8. A system comprising:
   a server device to:
   receive, from a plurality of server devices, sequence information associated with a call received by a first server device of the plurality of server devices and processed by the first server device and at least one second server device of the plurality of server devices,
   generate a unified record associated with the call, wherein the unified record includes at least some of the sequence information received from the first server device and the at least one second server device,
   determine, based on the unified record, that a first condition, associated with a duration of the call, exists or that a second condition, associated with a quantity of transfers regarding the call, exists,
   send an instruction to perform a customer operation, associated with an expedited handling of the call, when the first condition is determined to exist, wherein the expedited handling of the call includes moving the call toward a front of a queue associated with a customer service agent, and
   send an instruction to perform another customer service operation, associated with a specialized handling of the call, when the second condition is determined to exist, wherein the specialized handling of the call includes transferring the call from a current customer service agent handling the call to a particular customer service agent.

9. The system of claim 8, wherein the sequence information indicates a time when the call was received; and
   wherein, when generating the unified record associated with the call, the server device is further configured to:
   determine the duration of the call based on the time that the call was received by the first server device and a later time, and
   store information associated with the duration of the call in the unified record.

10. The system of claim 8, where, when generating the unified record associated with the call, the server device is further to:
   determine the quantity of transfers regarding the call based on a first quantity of the first server device and a second quantity of the at least one server device, from which the sequence information was received, and
   store information associated with the quantity of transfers in the unified record.

11. The system of claim 8, where, when determining that the first condition, associated with the duration of the call, exists or that the second condition, associated with the quantity of transfers regarding the call, exists, the server device is further to:
   compare the duration of the call with a time threshold, and
   determine that the first condition exists when the duration of the call exceeds the time threshold.

12. The system of claim 8, where, when determining that the first condition, associated with the duration of the call, exists or that the second condition, associated with the quantity of transfers regarding the call, exists, the server device is further to:
   compare the quantity of transfers regarding the call with a transfer threshold, and
   determine that the second condition exists when the quantity of transfers exceeds the transfer threshold.

13. The system of claim 8, where the unified record includes information associated with a period of time that the call was placed on hold; and
   wherein the server device is further configured to:
   compare the period of time that the call was placed on hold with a particular threshold,
   determine that a third condition, associated with the call, exists when the period of time that the call was placed on hold exceeds the particular threshold, and send an instruction to perform a different customer operation, associated with a priority handling of the call, when the third condition is determined to exist, wherein the priority handling of the call includes moving the call toward the middle of the queue associated with the customer service agent.

14. The system of claim 8, where, when sending the instruction to perform the customer operation, associated with expedited handling of the call, the server device is further to:
send the unified record or the sequence information to a particular server device, of the plurality of server devices, with which the customer service agent is associated.

15. The system of claim 8, where the server device is further to:
send the unified record or the sequence information to a process improvement team associated with the server device, the process improvement team being responsible for reducing a quantity of recurrence of the first condition or the second condition at for subsequent calls.

16. A server device comprising:
a processor to:
receive first-information associated with a call received by a first server device,
receive second-information associated with the call, wherein the second-information is associated with processing of the call by the first server device and at least one second server device,
generate a unified record associated with the call, wherein unified record includes at least some of the first-information and at least some of the second-information,
determine that a condition exists, with respect to the call, based on the unified record,
assign a priority to the call based on the determination that the condition exists, wherein the priority includes a first priority corresponding to a condition associated with a duration of the call or a second priority corresponding to a condition associated with a quantity of transfers regarding the call,
send a first instruction to expedite call handling when the priority assigned to the call is the first priority, and
send a second instruction for specialized call handling when the priority assigned to the call is the second priority, wherein the second instructions for the specialized call handling includes an indication that the call is to be transferred from a current customer service agent to a particular customer service agent.

17. The server device of claim 16, where the first instruction to expedite call handling includes an indication that the call is to be moved toward a front of a queue.

18. The server device of claim 16, where the unified record includes information associated with the duration of the call, and
where, when determining that the condition exists with respect to the call, the processor is to:
compare the duration of the call with a particular threshold,
determine that the condition, associated with the duration of the call, exists when the duration of the call exceeds the particular threshold, and
assign the first priority to the call based on the determination that the condition, associated with the duration of the call, exists.

19. The server device of claim 16, where the unified record includes information associated with the quantity of transfers regarding the call, and
where, when determining that the condition exists with respect to the call, the processor is to:
compare the quantity of transfers regarding the call with a particular threshold,
determine that the condition, associated with the quantity of transfers regarding the call, exists when the quantity of transfers exceeds the particular threshold, and
assign the second priority to the call based on the determination that the condition, associated with the quantity of transfers regarding the call, exists.

20. The server device of claim 16, where the unified record includes a period of time that the call is held in a queue, and
where, when determining that the condition exists, with respect to the call, the processor is to:
compare the period of time that the call is held in the queue to a particular threshold, and
determine that a condition, associated with the period of time that the call is held in the queue, exists when the period of time that the call is held in the queue exceeds the particular threshold.

21. The server device of claim 20, where, when assigning the priority to the call, the processor is further to:
assign a third priority to the call based on the determination that the condition, associated with the period of time that the call is held in the queue, exists, and
send a third instruction to priority call handling based on the assignment of the third priority to the call, where the priority call handling is different from the expedited call handling and the specialized call handling.

* * * * *